United States Patent [19]

Kohlhage

[11] 4,317,435

[45] Mar. 2, 1982

[54] METHOD AND DEVICE FOR OPERATING AN INTERNAL-COMBUSTION MACHINE WITH A FLYWHEEL COUPLED THERETO

[75] Inventor: Ernst H. Kohlhage, Bühl, Fed. Rep. of Germany

[73] Assignee: Luk Lamellen und Kupplungsbau, Bühl, Fed. Rep. of Germany

[21] Appl. No.: 46,056

[22] Filed: Jun. 6, 1979

[30] Foreign Application Priority Data

Jun. 6, 1978 [DE] Fed. Rep. of Germany ....... 2824682

[51] Int. Cl.³ .................. F02N 5/04; F16D 21/06; F16D 13/44
[52] U.S. Cl. .................. 123/179 J; 74/7 C; 74/572; 180/165; 192/48.8; 192/70.18; 192/70.27; 192/89 B
[58] Field of Search .................. 123/179 J; 74/572, 6, 74/7 R, 7 C; 192/48.1, 48.8, 70.18, 70.27, 89 B; 62/228 B; 290/38 B; 180/165

[56] References Cited

U.S. PATENT DOCUMENTS

| | | | |
|---|---|---|---|
| 1,230,160 | 6/1917 | Heins | 123/179 J |
| 1,847,784 | 3/1932 | Procunier et al. | 123/179 J |
| 2,282,878 | 5/1942 | Newton | 62/228 B X |
| 3,061,062 | 10/1962 | Smirl | 192/70.18 |
| 3,749,213 | 7/1973 | Maucher | 192/70.18 X |
| 3,882,950 | 5/1975 | Strohlein | 123/179 J X |

FOREIGN PATENT DOCUMENTS

| | | | |
|---|---|---|---|
| 2748697 | 10/1977 | Fed. Rep. of Germany | 74/572 |
| 123342 | 2/1919 | United Kingdom | 123/179 J |

Primary Examiner—Allan D. Herrmann
Attorney, Agent, or Firm—Herbert L. Lerner

[57] ABSTRACT

Method of operating an internal-combustion engine which is stoppable in accordance with specific conditions and stratable by a fly wheel disengageable from the internal-combustion engine by a clutch and re-engageable thereby when power is required, which includes bringing a friction wheel of a starter motor into engagement with the flywheel, when the flywheel is uncoupled from the internal-combustion engine, so as to accelerate the flywheel to a predetermined speed for starting up the internal-combustion engine, and thereafter engaging the clutch.

22 Claims, 5 Drawing Figures

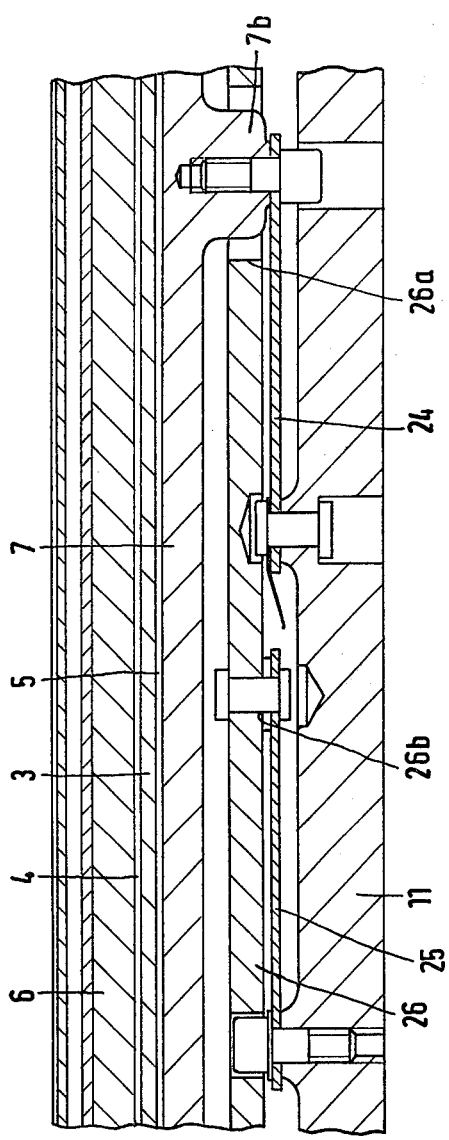
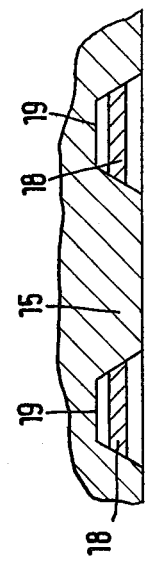

METHOD AND DEVICE FOR OPERATING AN INTERNAL-COMBUSTION MACHINE WITH A FLYWHEEL COUPLED THERETO

The invention relates to a method of operating an internal-combustion engine which is stoppable in accordance with specific circumstances or conditions, such as the operating or driving conditions of a motor vehicle, for example, especially when no motor power is required, and is startable by a flywheel disengageable from the internal-combustion engine by means of a clutch and re-engageable thereby when power is required. The invention further relates to a device for operating such an inter-combustion engine or units or installations operated by such internal-combustion engines.

A method for operating internal-combustion engines in motor vehicles has been proposed heretofore to have fuel under such operating conditions wherein the drive motor does not drive the vehicle i.e., for example, during thrust operation or while idling, and when the flywheel rotates at a minimal speed, by disconnecting the drive motor from the flywheel and stopping the engine. The flywheel then continues to rotate as an energy storage device and, after the hereinaforementioned operating conditions cease, the internal-combustion engine is restarted by reconnecting or recoupling the flywheel thereto.

It is accordingly an object of the invention to provide a method and device for operating such an internal-combustion engine which ensures proper operation thereof and, in particular, ensures setting the engine into operation i.e. starting or restarting it, under all operating conditions without any possibility of damage occurring to the flywheel or the starter, this object to be accomplished while simultaneously providing an economical construction having high efficiency and requiring little driving power.

With the foregoing and other objects in view, there is provided, in accordance with the invention, a method of operating an internal-combustion engine which is stoppable in accordance with specific conditions and startable by a flywheel disengageable from the internal-combustion engine by a clutch and re-engageable thereby when power is required, which comprises bringing a friction wheel of a starter motor into engagement with the flywheel, when the flywheel is uncoupled from the internal-combustion engine, so as to accelerate the flywheel to a predetermined speed for starting up the internal-combustion engine, and thereafter engaging the clutch.

Motor vehicles as well as other machines, such as heat pumps and the like can be operated in a manner that, under certain operating conditions, especially if no engine or motor power is required and the flywheel continues to rotate at a given minimum speed, the connection between the drive motor or engine and the flywheel is automatically interrupted and the drive motor or propulsion engine is stopped and the flywheel continues to rotate. In such applications, in accordance with another feature of the invention, is acceleratable again to a desired speed by the friction wheel of the starter motor which can be brought into engagement therewith when the speed of rotation of the flywheel subsequently falls below a certain value and, after the aforementioned operating conditions have ceased, the clutch can be engaged and the drive motor or propulsion engine started by the kinetic energy of the flywheel.

If the method is used for operating an internal-combustion engine for heat pumps, for example, the acceleration of the flywheel and, thereby, the starting or restarting i.e. the intermittent operation of the internal-combustion engine, can be accomplished, in accordance with a further feature of the invention, by temperature-dependent operation of the starter. For this purpose, the water temperature i.e. the household supply or hot-water temperature, for example, the air temperature i.e. the inside and/or outside temperature or the like, can be utilized.

In accordance with the invention, a device is provided for performing the method according to the invention wherein the flywheel engageable with and disengageable from the internal-combustion engine in accordance with specific conditions, such as the operating condition of a motor vehicle, has a part thereof formed with a contact surface for the friction wheel of the starter.

In accordance with another feature of the invention, the clutch for engaging the flywheel with and disengaging it from the internal-combustion engine has an entrainer disc secured to a rotatable part of the internal-combustion engine against axial and rotary displacement relative thereto, the entrainer disc having two friction surfaces, a pair of pressure plates each having a respective opposing friction surface located on opposite sides of the entrainer disc, a cup spring actuatable for positively moving the pressure plates in opposite directions, the cup spring having a radially outer region operatively engageable with one of the pressure plates and a radially inner region operatively engageable with the other of the pressure plates, an axially fixed tilting support having a circular disposition located radially between the radially outer and the radially inner regions, the cup spring being pivotable on the tilting support, the tilting support being disposed on an axially fixed part of the flywheel, the flywheel part being mounted for relative rotation with the rotatable part of the internal combustion engine, torque transmission means for transmitting torque between the rotatable part of the internal combustion engine, on the one hand, and the pair of axially movable pressure plates of the clutch, and actuating means engaging the cup spring at radially inner regions thereof.

In accordance with a further feature of the invention, the part formed with a contact surface for engagement with the friction wheel of the starter is axially fixed.

In accordance with an added feature of the invention, the contact surface is formed on a part fastened to the flywheel part.

In accordance with an additional feature of the invention, the contact surface is conical, and the wheel of the starter, which is preferably a worm-drive starter, is correspondingly conical and is axially displaceable into engagement therewith.

In accordance with yet another feature of the invention, the cup spring for the clutch is a spring which operates as a pure lever element and which acts to apply oppositely directed pressure farther radially inwardly therewith. In by far the most cases, however, and in accordance with yet a further feature of the invention, the spring force of the cup spring is utilized for applying pressure to the pressure plates, the cup spring being installed against or opposite to the mounting direction thereof and, due to the prestressing thereof, loading the pressure plates in direction toward the drive plate or entrainer disc.

In accordance with yet an added feature of the invention, the one pressure plate is located toward the side of the internal-combustion engine and has a cage-like enlargement which extends over the entrainer disc and the other pressure plate in axial direction.

In accordance with yet an additional feature of the invention, a support of the first pressure plate for the cup spring is provided on the cage-like enlargement and extends radially inwardly as a radial continuation over the function surfaces.

In accordance with another feature of the invention, the torque transmission means are elastic in axial direction and stiff in circumferential direction so that the flywheel part, the cup spring and the pair of pressure plates form a unit rotatable relative to the rotatable part of the internal-combustion engine, such as the crankshaft thereof and the entrainer disc.

In accordance with a further feature of the invention, another clutch is mounted on the flywheel part and forms part of the unit. Such a second clutch is required particularly for the operation of motor vehicles, namely for interrupting the connection of the engine or motor to the drive wheels, the instant such operating conditions occur wherein the propulsion engine or drive motor need not drive the vehicle i.e. in pushing or thrusting and idling operation, for example, the flywheel being separated from the engine or motor and continuing to rotate as an energy storage device for restarting. Although it may be advantageous, in accordance with the invention, to mount this second clutch directly on the flywheel, the second clutch can also be provided elsewhere in specific cases.

In accordance with an added feature of the invention, the one pressure plate has a cage-like enlargement with a radially inwardly extending continuation and the torque transmission means comprise leaf springs having fastening points for the one pressure plate located on the radially inwardly extending continuation, and the other pressure plate is formed with dogs extending through recesses formed in the radially inwardly extending continuation, the fastening points of the leaf springs for the other pressure plate being located on the dogs.

In accordance with an additional feature of the invention, the torque transmission means connect the one to the other pressure plate, and also the one pressure plate to the flywheel part.

In accordance with an alternate feature of the invention, the torque transmission means connect the one to the other pressure plate, and also the other pressure plate to the flywheel part.

In accordance with yet another feature of the invention, the torque transmission means extend from the flywheel part to the one and to the other pressure plate.

In accordance with yet a further feature of the invention, the torque transmission means engage the pressure plates and simultaneously exert a lifting force directed away from the entrainer disc.

In accordance with yet an added feature of the invention, the tilting support disposed on the flywheel part is displaceable in axial direction on the flywheel part.

In accordance with yet an additional feature of the invention, the axially displaceable tilting support is then adjustable in axial direction properly so as to avoid lifting losses.

In accordance with another feature of the invention, the device includes screws provided in the flywheel part and engaging in the tilting support for adjusting the tilting support in axial position thereof.

In accordance with a concomitant feature of the invention, the device includes an antirotation device securing the flywheel part to the tilting support for preventing relative rotation therebetween, the tilting support, for example, being an annular member, and the aforementioned screws being engageable in recesses formed in the tilting support.

Other features which are considered as characteristic for the invention are set forth in the appended claims.

Although the invention is illustrated and described herein as embodied in method and device for operating an internal-combustion machine with a flywheel coupled thereto, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawing, in which:

FIG. 4 is a sectional view of FIG. 2 taken along the line IV—IV in direction of the arrows; and FIG. 5 is a sectional view of FIG. 3 taken along the line V—V in direction of the arrows.

Figure 1:
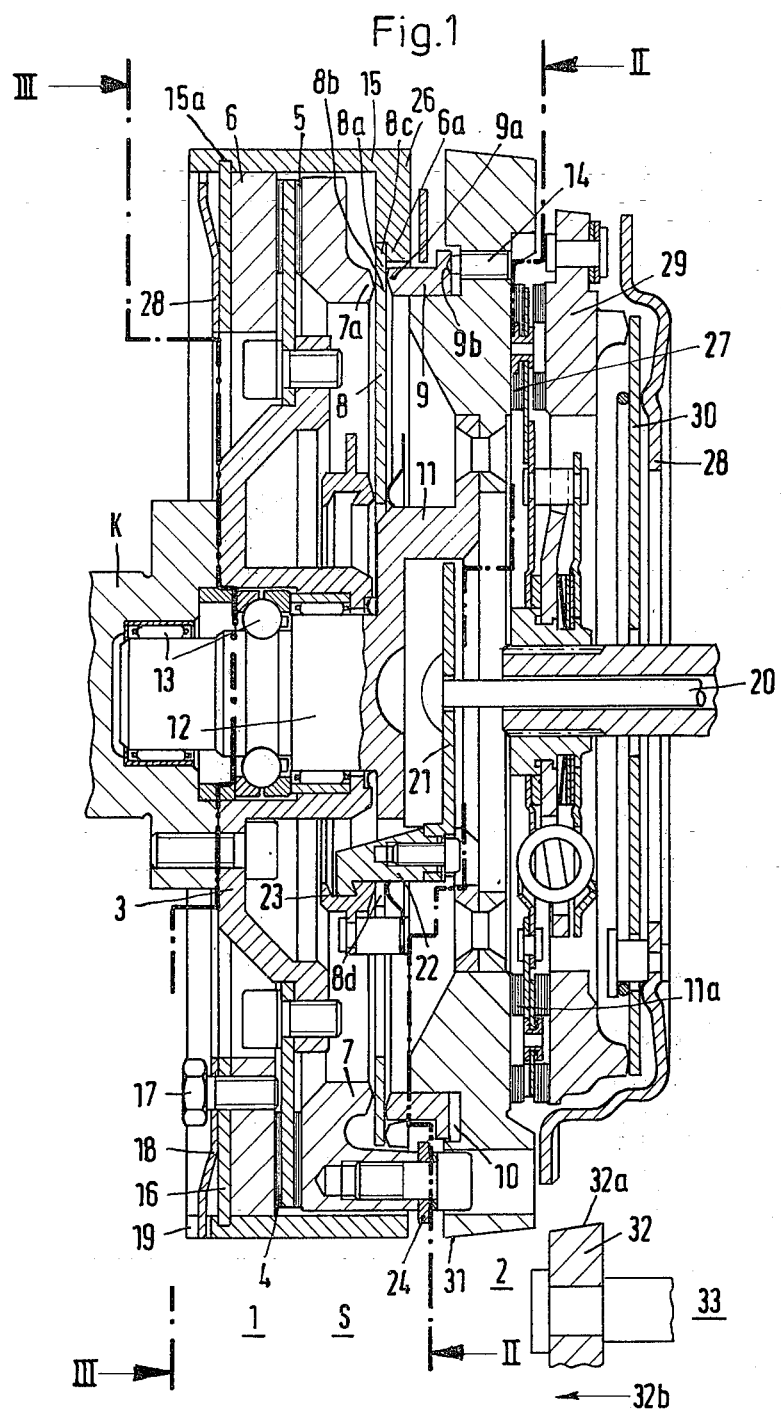
FIG. 1 is a sectional view of a flywheel, which is acceleratable in disengaged condition and, thereafter, couplable to an internal-combustion engine, the flywheel being shown with a first clutch for engaging and disengaging the flywheel, and a second clutch for shifting a variable transmission.

Referring now to the drawing and first, particularly, to FIG. 1 thereof, there is shown a flywheel S which can be coupled to and decoupled from an internal-combustion engine and, more particularly, the crankshaft K of an internal-combustion engine, by means of a first clutch 1, and, more particularly, a second clutch 2 for shifting a variable transmission or change-speed gear being also shown.

On the crankshaft K, there is fastened an entrainer disc or drive plate 3 which is fixed against relative motion therewith in rotary and axial direction and which has friction linings 4 and 5, on both sides of which, a respective pressure plate, namely, a first pressure plate 6 facing toward the internal-combustion engine, and a second pressure plate 7 are disposed.

The two pressure plates 6 and 7 are forcibly movable opposite to one another by means of a cup or disc spring 8 toward and away from the friction linings 4 and 5 of the entrainer disc or drive plate 3. To this end, the cup spring 8 has a region 8a at which it is braced against an axially fixed support 9 and is pivotable about a supporting, roll-off or tilting seat 9a located thereon. The support or abutment 9 is a ring-shaped component which is provided in a recess 10 of a flywheel part 11. The flywheel part 11 is rotatable relative to the crankshaft K and the drive plate 3 by means of a journal 12 and an antifriction bearing 13, but is axially secured with respect to the crankshaft K and the drive plate 3. The support 9 with the seat 9a thereof is adjustable in axial direction by means of screws 14 which project into a recess 9b formed in the support 9, but is secured, however, in circumferential direction. The axial adjustment serves for accurately setting or positioning the tilting or tipping surface or seat 9a at the bracing region 8a of the cup spring 8.

Figure 3:
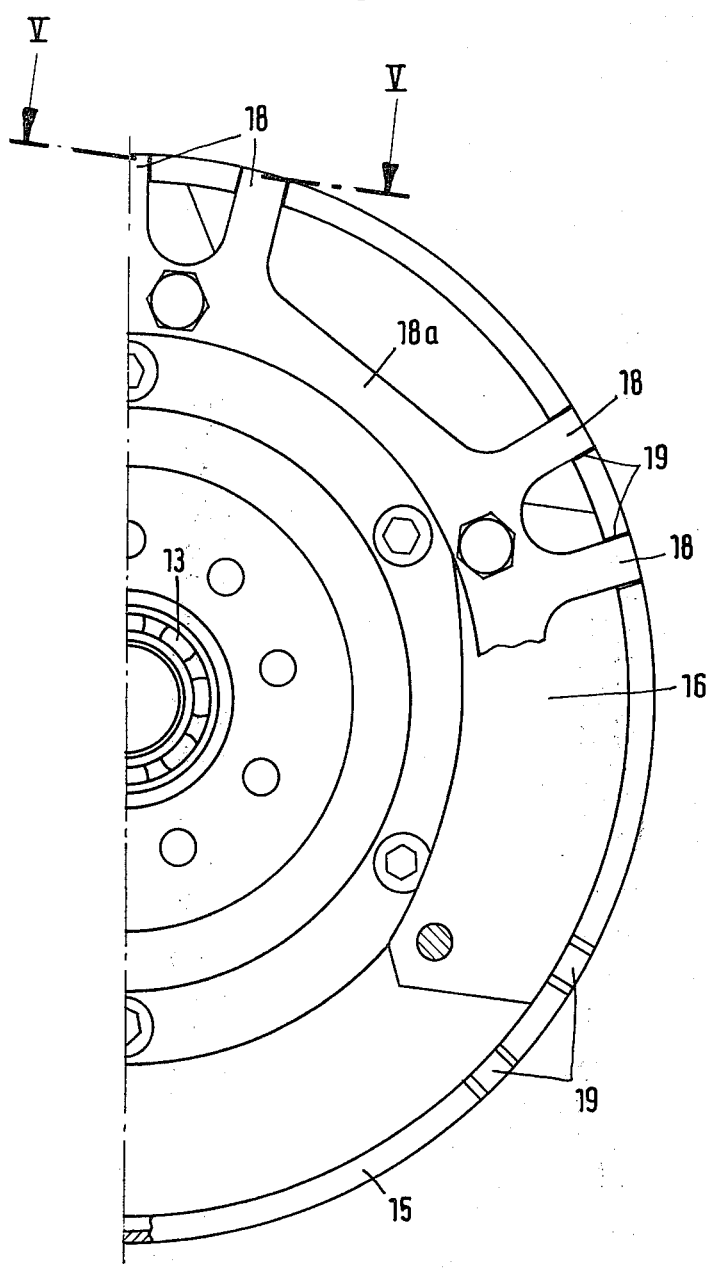
FIG. 3 is a sectional view of FIG. 1 taken along the line III—III in direction of the arrows.

The cup spring 8 is assembled in a prestressed position and, specifically, so that, with the prestressing force thereof, the pressure plate 7 as well as the pressure plate 6 is loaded or biased in direction toward the friction linings 4 and 5 of the entrainer disc or drive plate 3. To this end, the cup spring 8 has a region 8b thereof disposed radially within the tilting region 8a, by which it engages a cam or dog 7a of the second pressure plate 7 and thus subjects it as well as the second pressure plate 7 to a loading in a direction toward the friction linings 4 and 5 of the entrainer disc or drive plate 3. At a radially outer region 8c thereof, the cup spring 8 loads a support region 6a, which is provided on a cage-like extension 15 of the pressure plate 6, whereby the latter is drawn in direction toward the friction lining 4 of the entrainer disc or drive plate 3. The cage-like extension 15 is fastened to the pressure plate 6 by means of two systems of securing members, as is also apparent in connection with FIGS. 3 and 5. One of the securing systems, which is effective in axial direction, is formed of several plate-like parts 16 which are fastened by screws 17 to the pressure plate 6 and engage in a slot or groove 15a formed in the cage-like extension 15. The second securing system, which is effective in circumferential direction, is formed of several claws 18 which extend from a ring-shaped member 18a and engege in slots 19 formed in the cage-like part 15. The slots 19 are wedge-shaped and the claws 18 are formed accordingly. The claws 18 effect an axial tightening or clamping of the pressure plate 6 and the cage-like extension 15 to one another.

For disengaging the clutch 1, a tension or pull rod 20 is provided which is linked to a pressure plate 21 having attached arms 22 and a pressure piece 23 fastened thereto by which it engages behind radially inner regions 8d of the cup spring 8. If tension is exerted on the pull rod 20 to the right hand side of FIG. 1 as viewed, the cup spring 8 tips counterclockwise about the tilting support 9a i.e. the inner region 8b moves to the right-hand side and the radially outer region 8a of the cup spring 8 tilts to the left-hand side. The pressure plate 7 can thereby move toward the right-hand side and the pressure plate 6 toward the left-hand side, as viewed in FIG. 1.

Figure 2:
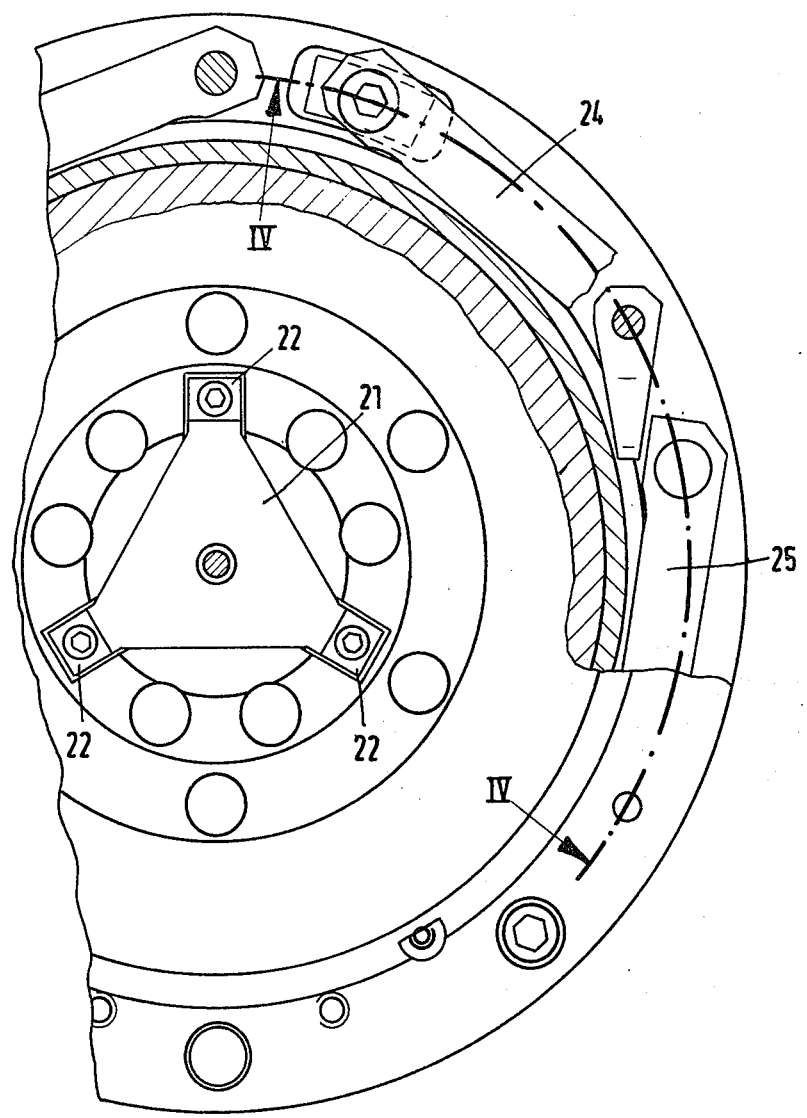
FIG. 2 is a sectional view of FIG. 1 taken along the line II—II in direction of the arrows.

As is evident especially from FIGS. 1, 2 and 4, the flywheel part 11 and the two pressure plates 6 and 7 of the first clutch are connected one to the other by torque transmission means in the form of leaf springs 24 and 25. As shown especially in FIG. 4, the leaf springs 24 extend from dogs or cams 7b of the pressure plate 7 which pass through a recess or cutout 26a formed in a radial continuation 26 of the cage-like extension 15 to the flywheel part 11. The leaf springs 25 connect to the radial continuation 16 at 26b and, thus, by means of the cage-like extension 15, connect the first pressure plate 6 to the flywheel part 11. The leaf springs 24 and 25 are prestressed so that, if the cup spring 8 is stres-relieved in the hereinaforedescribed manner, the pressure plates 6 and 7 are lifted off the friction linings 4 and 5.

To engage the clutch, the tension or pull rod 20 is moved to the left-hand side, as viewed in FIG. 1, the cup spring 8 is tilted or tipped clockwise about the tilting support 9 and, due to the force thereof, presses the two pressure plates 6 and 7 through the intermediary of the support 6a and 7a against the friction surfaces 4 and 5 of the entrainer disc or drive plate 3, forcibly or positively and in opposite directions.

The flywheel part 11 has one friction surface 11a for a clutch disc 27 of the second clutch 2, the housing or cover 28' of which is screwed to a surface of the flywheel part 11. The second friction surface for the clutch disc 27 is on a pressure plate 29 which is loaded or stressed in a conventional manner by a cup or disc spring 30. By actuating the non-illustrated radial tongues of the conventional cup spring 30 in direction toward the left-hand side, as viewed in FIG. 1, the clutch 2 is disengaged i.e. in the opposite direction than in the case for disengaging the clutch 1.

The flywheel part 11 has a conical surface 31 which serves as a run-up surface for a friction wheel 32 which likewise has a conical run-up surface 32a. The friction wheel 32 is fastened to a starter 33, not shown in detail, which is preferably a worm-drive starter.

For starting the internal-combustion engine, the clutch 1 is disengaged; the clutch 2 may also possibly be disengaged unless the transmission is set in neutral. The clutch 1 can be disengaged i.e. the two pressure plates 6 and 7 can be lifted off the entrainer disc or drive plate 3, in accordance with the actuation of the ignition key. The starter motor 33 is then set in motion, the friction wheel 32 is moved in direction of the arrow 32b until its conical surface 32a engages the conical surface 31 and then the flywheel i.e. the flywheel part 11 with the clutch 2, and, by means of the leaf springs 24 and 25, the pressure plates 6 and 7 together with the cup spring 8, are accelerated to relatively high rotary speeds. By engaging the clutch 1 i.e., by coupling the flywheel, the engine is started.

Under such operating conditions, for example, driving conditions of a motor vehicle wherein the drive wheels would drive the internal-combustion engine, for example, during so-called thrust or moving operation as well as during stoppages resulting from traffic, the clutch 1 can be disengaged, and the internal-combustion engine can be shut off. If the clutch 2 is also disengaged, the flywheel can continue to rotate and, if the speed thereof should fall below a given value, it is brought up to a higher speed again by the starter motor 33 and the friction wheel 32; this process can be repeated until power is again required of the internal-combustion engine. Then the clutch 1 is engaged and the internal-combustion engine is restarted.

The method according to the invention and the device for performing the same can also be used for other units or assemblies that are to be driven, such as for the operation of heat pumps, for example. The starting of the internal-combustion engine by the friction-wheel starter i.e. the acceleration or high-speed rotation of the flywheel, can also be a temperature-dependent operation, for example, it can be dependent upon the water temperature i.e. household supply or hot-water temperature or dependent upon the temperature prevailing inside and/or outside of rooms. In this connection, the flywheel can also be decoupled after the internal-combustion engine is shut off, as is described in connection with the operation of such internal-combustion engines for motor vehicles and, after the speed has dropped below a certain value, the flywheel can be brought up again to a given higher speed by the friction-wheel starter and, by repeated engagement of the friction-wheel started within these speed ranges, will "oscillate" and, when required or upon demand of the internal-combustion engine, the clutch of the flywheel is engaged and the flywheel restarts the internal-combustion engine.

I claim:

1. Method of operating an internal-combustion engine which is automatically stoppable in accordance with specific conditions, such as when no driving power is required, and startable by a flywheel disposed concentrically to the crankshaft of the internal-combustion engine for compensating for an extent of nonuniformity in the rotation thereof, said flywheel being automatically disengageable from the internal-combustion engine by a clutch and automatically re-engageable thereby when power is required, which comprises automatically bringing a friction wheel of a starter motor into engagement with the flywheel, when the flywheel is uncoupled from the internal-combustion engine, so as to accelerate the flywheel to a predetermined speed for starting up the internal-combustion engine, and thereafter engaging the clutch, the flywheel remaining engaged with the internal-combustion engine while the engine delivers power.

2. Method according to claim 1 which comprises actuating the starter in accordance with a given temperature for accelerating the flywheel and thereby starting the internal-combustion engine.

3. Method of operating an internal-combustion engine which is automatically stoppable in accordance with specific operating conditions of a motor vehicle, such as when no driving power is required, and startable by a flywheel disposed concentrically to the crankshaft of the internal-combustion engine for compensating for an extent of nonuniformity in the rotation thereof, said flywheel being automatically disengageable from the internal-combustion engine by a clutch which comprises, when the flywheel is automatically uncoupled from the internal-combustion engine, at initial start up when beginning to drive, bringing a friction wheel of a starter motor automatically into engagement with the flywheel so as to accelerate the flywheel to a predetermined speed and thereafter automatically engaging the clutch, then, under given operating conditions requiring no engine power, automatically uncoupling the flywheel from the internal-combustion engine and automatically stopping the internal-combustion engine while the flywheel continues to rotate and, when the speed of the flywheel falls below a given value bringing a friction wheel automatically rotatable by the starter motor into engagement with the flywheel, which has been uncoupled from the internal-combustion engine and is rotating, so as to impart kinetic energy thereto sufficient for assuring restarting of the internal-combustion engine when power is required and, when such power is required, automatically engaging the clutch so as to start up the internal-combustion engine through the kinetic energy of the flywheel, the flywheel remaining engaged with the internal-combustion engine while the motor vehicle required power.

4. Device for performing a method operating an internal-combustion engine which is automatically stoppable in accordance with specific conditions, such as when no driving power is required, and startable by a flywheel disposed concentrically to the crankshaft of the internal-combustion engine for compensating for an extent of nonuniformity in the rotation thereof, said flywheel being automatically disengageable from the internal-combustion engine by a clutch and automatically re-engageable thereby when power is required, comprising a friction wheel of a starter motor automatically engageable with the flywheel, when the flywheel is uncoupled from the internal-combustion engine, so as to accelerate the flywheel to a predetermined speed for starting up the internal-combustion engine, the flywheel having a part thereof formed with a contact surface for the friction wheel of the starter motor, the flywheel being is maintained engagement with the internal-combustion engine while the engine delivers power.

5. Device according to claim 4 wherein said part formed with a contact surface for engagement with the friction wheel of the starter is axially fixed.

6. Device according to claim 5 wherein said contact surface is formed on a part fastened to said flywheel part.

7. Device according to claim 4 wherein said contact surface is conical, and said starter friction wheel is correspondingly conical and is axially displaceable into engagement therewith.

8. Device for performing a method of operating an internal-combustion engine which is automatically stoppable in accordance with specific conditions requiring no engine power and startable by a flywheel automatically disengageable from the internal-combustion engine by a clutch and automatically reengageable thereby when power is required comprising an entrainer disc carried by the clutch and secured to a rotatable part of the internal-combustion engine against axial and rotary displacement relative thereto, said entrainer disc having two friction surfaces, a pair of pressure plates each having a respective opposing friction surface located on opposite sides of said entrainer disc, a cup spring actuatable for positively moving said pressure plates in opposite directions, said cup spring having a radially outer region operatively engageable with one of said pressure plates, and a radially inner region operatively engageable with the other of said pressure plates, an axially fixed tilting support having a circular disposition located radially between said radially outer and said radially inner regions, said cup spring being pivotable on said tilting support, said tilting support being disposed on an axially fixed part of the flywheel, said flywheel part being mounted for relative rotation with the rotatable part of the internal-combustion engine, torque transmission means for transmitting torque between said axially fixed part of the flywheel, on the one hand, and the pair of axially movable pressure plates of the clutch, on the other hand, and actuating means engaging said cup spring at radially inner regions thereof.

9. Device according to claim 8 including means for securing said flywheel part to said tilting support for preventing relative rotation therebetween.

10. Device according to claim 8 wherein said cup spring is mounted with prestressing and loads said pressure plates in direction toward said entrainer disc.

11. Device according to claim 8 wherein the one pressure plate is located toward the side of the internal-combustion engine and has a cage-like enlargement which extends over said entrainer disc and the other pressure plate in axial direction.

12. Device according to claim 11 wherein a support of the one pressure plate for said cup spring is provided on said cage-like enlargement and extends radially inwardly as a radial continuation over said friction surfaces.

13. Device according to claim 8 wherein said torque transmission means are elastic in axial direction and stiff in circumferential direction so that said flywheel part, said cup spring and said pair of pressure plates form a unit rotatable relative to the rotatable part of the internal-combustion engine and still entrainer disc.

14. Device according to claim 13 including another clutch mounted on said flywheel part and forming part of said unit.

15. Device according to claim 13 wherein the one pressure plate has a cage-like enlargement with a radially inwardly extending continuation and said torque transmission means comprise leaf springs having fastening points for said one pressure plate located on said radially inwardly extending continuation, and the other pressure plate is formed with dogs extending through recesses formed in said radially inwardly extending continuation, the fastening points of said leaf springs for said other pressure plate being located on said dogs.

16. Device according to claim 13 wherein said torque transmission means connect said one to said other pressure plate, and also said one pressure plate to said flywheel part.

17. Device according to claim 13 wherein said torque transmission means connect said one to said other pressure plate, and also said other pressure plate to said flywheel part.

18. Device according to claim 13 wherein said torque transmission means extend from said flywheel part to said one and to said other pressure plate.

19. Device according to claim 8 wherein said torque transmission means engage said pressure plates and, simultaneously, exert a lifting force upon said pressure plates directed away from said entrainer disc.

20. Device according to claim 8 wherein said tilting support disposed on said flywheel part is displaceable in axial direction on said flywheel part.

21. Device according to claim 20 wherein said axially displaceable tilting support is adjustable in axial direction.

22. Device according to claim 21 including screws provided in said flywheel part and engaging in said tilting support for adjusting said tilting support in axial position thereof.

* * * * *